Dec. 16, 1941. R. N. HEALD 2,266,034
CORRECTING OUT-OF-ROUNDNESS IN ANNULAR BODIES
Filed July 8, 1938 2 Sheets-Sheet 1

Inventor
Roger N. Heald
By Geo. H. Kennedy Jr.
Attorney

Dec. 16, 1941.  R. N. HEALD  2,266,034
CORRECTING OUT-OF-ROUNDNESS IN ANNULAR BODIES
Filed July 8, 1938.  2 Sheets-Sheet 2

Inventor
Roger N. Heald
Geo. H. Kennedy Jr.
Attorney

Patented Dec. 16, 1941

2,266,034

UNITED STATES PATENT OFFICE 2,266,034

CORRECTING OUT-OF-ROUNDNESS IN ANNULAR BODIES

Roger N. Heald, Worcester, Mass., assignor to The Heald Machine Company, Worcester, Mass., a corporation of Massachusetts Application July 8, 1938, Serial No. 218,206

2 Claims. (Cl. 153—10)

The present invention relates to a means and method by which out-of-round conditions in the surfaces of annular bodies may be overcome and corrected. Such out-of-roundness, which may result from internal stresses occasioned by machining or heat treating or by seasoning of the annular member, or from any other cause, is frequently a serious handicap to proper operation or functioning of the member, as for example where the latter is required to rotate in a bearing or other support; under these conditions the out-of-roundness, however slight, tends continually to shift the axis of rotation and thus prevents the member from running true. By my invention, as hereinafter described, an out-of-round annular member may be subjected to localized corrective distortions of closely-controllable intensity, preferably while positioned for rotation in the bearing or support in which it is to run, in such fashion as to overcome or at least to minimize the out-of-round condition.

Other and further objects and advantages of the invention will more fully appear from the following detailed description taken in connection with the accompanying drawings, in which—

Like reference characters refer to like parts in the different figures.

Figure 1:
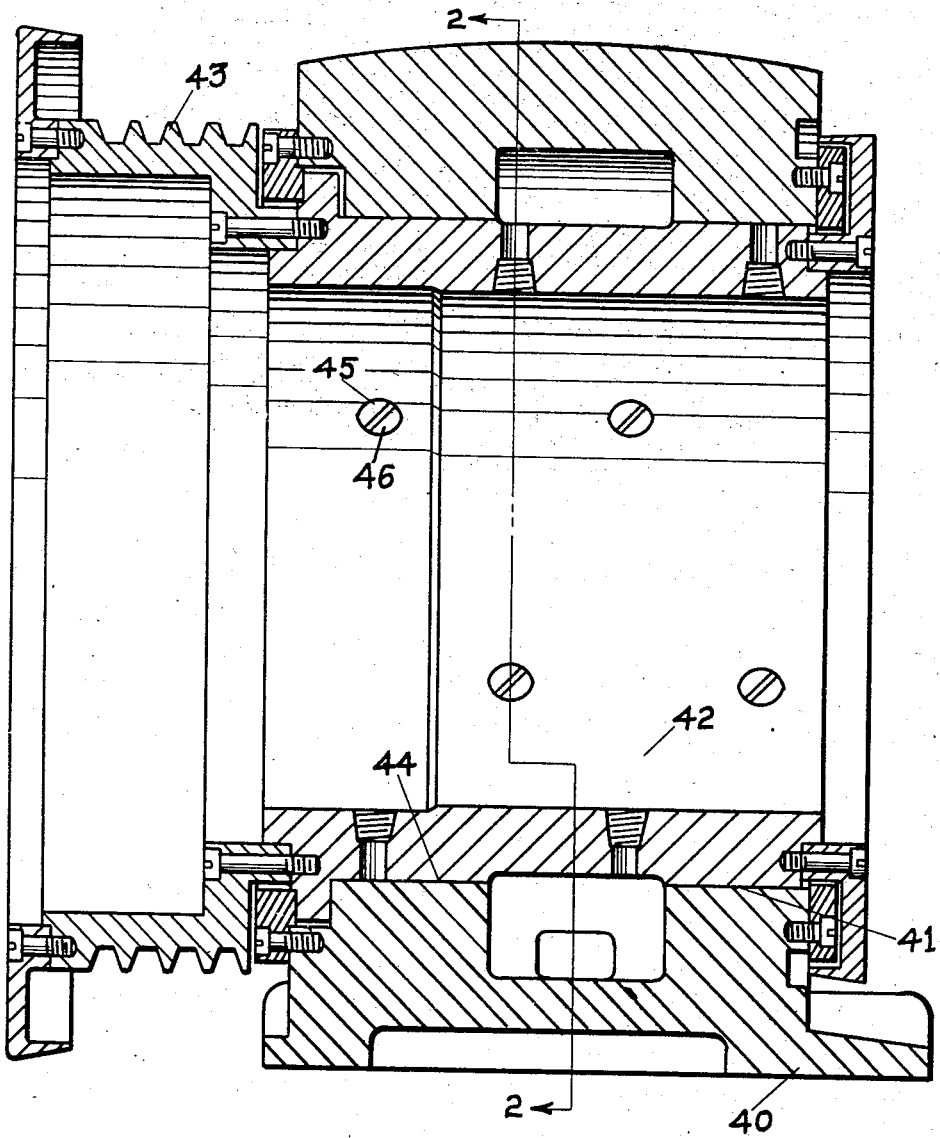
Fig. 1 is a sectional view showing, as an illustrative embodiment of my invention, the latter's adaptation to the rotary workholding means of a machine tool.
Figure 2:
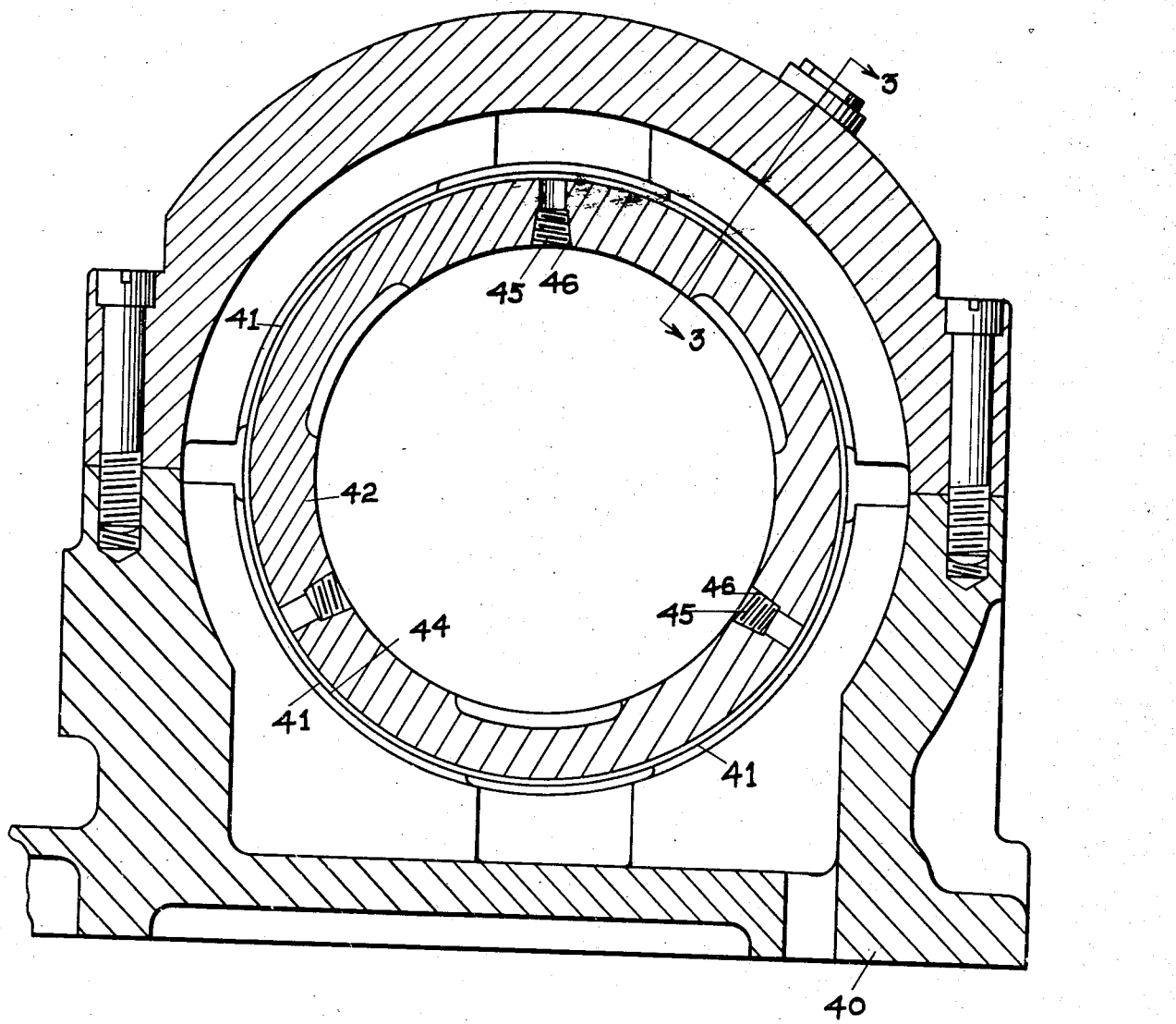
Fig. 2 is a transverse sectional view along the line 2—2 of Fig. 1.
Figure 3:
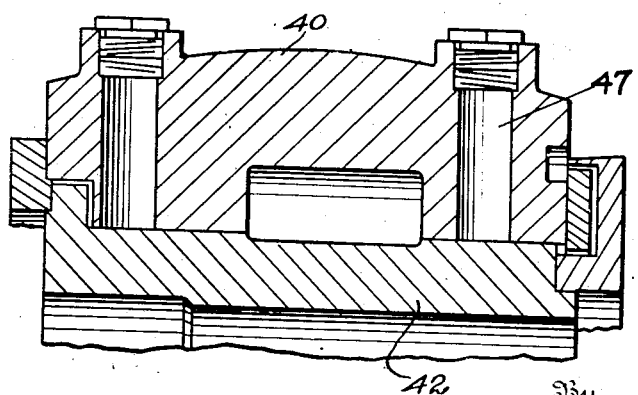
Fig. 3 is a fragmentary sectional view along the line 3—3 of Fig. 2.

As exemplifying a structure to which my invention is applicable, Figs. 1, 2 and 3 depict the workhead of a machine tool, such as an internal grinding or boring machine—wherein the work (not shown) to be operated upon is adapted to be arranged within and carried by an annular member or sleeve 42, the latter being rotatably journalled in a cylindrical bore 41 provided by a suitable support or housing 40. The rotation of said annular member or sleeve 42 may be effected in any well-known manner as by a belt, now shown, having driving engagement with a pulley 43 secured to one end of sleeve 42.

Obviously, if the outer or bearing surface 44 of said sleeve 42 is out-of-round, the sleeve will not run true in the bore 41. To overcome such out-of-roundness, the present invention provides for expanding the inner surface of the sleeve at spaced selected points, thereby distorting the sleeve to such an extent that the high and low spots in the out-of-round periphery are equalized.

Figure 4:
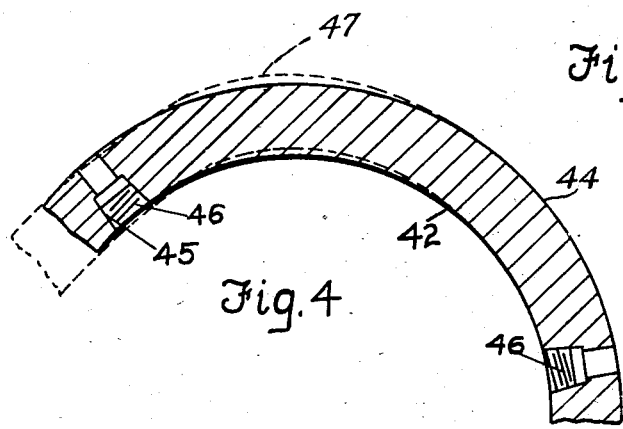
Fig. 4 is a fragmentary diagrammatic sectional view, illustrating the effect of the distortions contemplated by my invention.

In accordance with the present invention, the inner surface of the sleeve has a plurality of openings 45 therein, preferably arranged in pairs uniformly spaced about the sleeve with adjacent pairs staggered with respect to each other. In each of these openings is screwed a suitable expansion member such as a tapered screw 46, each of which has contact only with the sleeve and may be tightened or loosened to exert a localized expanding or contracting action on the adjacent portion of the sleeve, thereby through proper manipulation and adjustment to overcome or minimize the out-of-roundness of the outer surface of the sleeve. The tapered screws 46, 46 preferably extend only part way through the sleeve wall, and the approximate effect of the localized expanding forces set up by the tapered screws is shown in Fig. 4, where the full lines represent a section of the sleeve 42 before the tapered screw is turned tightly enough to exert any expanding forces. After the tapered screw has been forced into the tapped hole, the adjacent portion of the sleeve assumes the position shown in dotted lines by reason of the expanding forces on the inner surface of the sleeve, thereby somewhat flattening the sleeve immediately adjacent to the screw and increasing the roundness at points spaced slightly from the screw, as shown in the dotted lines at 47, Fig. 4.

Any annular body or sleeve such as the member 42, equipped as shown with a multiplicity of expansion devices such as the tapered screws 46, can readily be corrected for out-of-roundness by cut-and-try methods, the individual screws in various locations being tightened or loosened as the case may require until a smooth and accurate running of the member, indicative of its roundness, is obtained. Or, if it is desired to test a so-equipped sleeve 42, when arranged in its bearing, for roundness, this can be done by mounting a suitable contact indicator, not shown, in one or more of the radial openings 47, Fig. 3, of the housing 40, so that the end of the indicator feeler or finger will just engage, normally with the outer surface 44 of said sleeve. This enables the high and low areas of said surface 44 to be located, and then corrected in the manner above described by tightening or loosening the adjacent screws 46, as required.

It will be understood that the showing herein of tapped holes and tapered screws is merely illustrative, and that other similar arrangements for applying localized expanding forces to selected areas or portions of the sleeve may, within the contemplation of my invention, be employed, as for example driven wedges in place of the screws, or other suitable means for applying the desired localized expanding forces on predetermined portions of that surface of the sleeve which is opposite to the surface whose out-of-roundness is to be overcome or corrected.

Although the invention is described in connection with a journalled sleeve, it will be apparent that the invention is equally applicable for correcting the out-of-roundness of any annular member, regardless of the purpose for which it is to be used. The invention may also be applied to the intentional distortion of an annular member to impart to it a predetermined out-of-roundness, if desired.

I claim:

1. In the art of correcting or overcoming the out-of-roundness of one surface of a continuous annular member, the improvement which consists in forming in the wall of said member a plurality of tapered holes spaced circumferentially and axially from each other, entering in some or all of said holes, from the opposite surface, tapered screws, and tightening or loosening such of said screws, for localized expansions or contractions of the wall material, as will, by distortion, establish the approximate roundness of the first-mentioned surface.

2. In the art of correcting or overcoming the out-of-roundness of one surface of a continuous annular member, the improvement which consists in providing in the surface opposite the aforesaid surface of said member a plurality of apertures spaced circumferentially and axially from each other, entering in some or all of said apertures from said opposite surface a plurality of adjustable expansion devices, adjusting certain of said devices in selected locations, for such localized contractions or expansions of the wall material of said member as will throw said first-mentioned surface into a condition of approximate roundness, testing said first-mentioned surface in rotation, for the location of any high or low spots, and adjusting such of said devices in the vicinity of said spots to obtain such localized contractions or expansions of the wall material of said member as will substantially eliminate such high or low spots on said first-mentioned surface.

ROGER N. HEALD.